(12) United States Patent
Baumbick et al.

(10) Patent No.: US 10,793,105 B1
(45) Date of Patent: Oct. 6, 2020

(54) VEHICLE STORAGE SYSTEM

(71) Applicant: Ford Global Technologies, LLC, Dearborn, MI (US)

(72) Inventors: Jim Baumbick, Northville, MI (US); Stuart C. Salter, White Lake, MI (US); Annette Lynn Huebner, White Lake, MI (US); Joshua Greiner, Detroit, MI (US); Pietro Buttolo, Dearborn Heights, MI (US); David Brian Glickman, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/710,426

(22) Filed: Dec. 11, 2019

(51) Int. Cl.
  *B60R 25/10* (2013.01)
  *B60R 11/00* (2006.01)
  *B60R 25/102* (2013.01)
  *B60R 5/04* (2006.01)

(52) U.S. Cl.
  CPC .......... *B60R 25/1001* (2013.01); *B60R 5/044* (2013.01); *B60R 25/102* (2013.01); *B60R 25/1004* (2013.01); *B60R 2011/0028* (2013.01)

(58) Field of Classification Search
  CPC . B60R 25/1001; B60R 5/044; B60R 25/1004; B60R 25/102; B60R 2011/0028
  USPC ............................................ 340/426.24
  See application file for complete search history.

(56) References Cited

U.S. PATENT DOCUMENTS

| | | | |
|---|---|---|---|
| 6,712,249 B2 | 3/2004 | Magnusson et al. | |
| 8,970,377 B2* | 3/2015 | Heine ................ | G08B 13/2462 340/10.1 |
| 9,449,488 B2 | 9/2016 | Zafiroglu et al. | |
| 9,539,938 B1* | 1/2017 | Bosco ..................... | B60J 7/106 |
| 10,144,424 B2* | 12/2018 | Hara ..................... | B60W 30/16 |
| 10,189,506 B2* | 1/2019 | Moore ................... | B62D 25/06 |
| 2016/0006577 A1 | 1/2016 | Logan | |
| 2019/0271182 A1* | 9/2019 | Lovasz ................... | B60J 7/194 |

FOREIGN PATENT DOCUMENTS

KR 2019002513 A 3/2019

\* cited by examiner

*Primary Examiner* — John A Tweel, Jr.
(74) *Attorney, Agent, or Firm* — David Coppiellie; Price Heneveld LLP

(57) ABSTRACT

A vehicle component storage system for a vehicle is disclosed herein. The vehicle component storage system includes a storage container that is configured to hold a vehicle component, a sensor for sensing the position of the storage container relative to the vehicle, an electronic device for communicating with the user, and a controller configured to prompt the electronic device to issue an alert to the user based on data received from the sensor relating to the position of the storage container relative to the vehicle.

19 Claims, 6 Drawing Sheets

VEHICLE STORAGE SYSTEM

FIELD OF THE DISCLOSURE

The present disclosure generally relates to a storage system for a vehicle. More specifically, the present disclosure relates to a storage bag for holding a vehicle component.

BACKGROUND OF THE DISCLOSURE

Some vehicles include roof panels that may be removed. A system for storing removed roof panels that allows vehicle users to know the position of the removable roof panels may be desired.

SUMMARY OF THE DISCLOSURE

According to a first aspect of the present disclosure, a vehicle component storage system for a vehicle includes a storage container that is configured to hold a vehicle component. The vehicle component storage system further includes a sensor for sensing a position of the storage container relative to the vehicle, an electronic device for communicating with the user, and a controller. The controller is configured to prompt the electronic device to issue an alert to the user based on data received from the sensor relating to the position of the storage container relative to the vehicle.

Embodiments relating to the first aspect of the present disclosure may include any one or a combination of the following features:
  the sensor is coupled to the storage container;
  the sensor is a wireless communication transceiver operable to communicate with a plurality of wireless communication transceivers coupled to the vehicle;
  the position of the storage container relative to the vehicle is determined through triangulation of the signal strength and time to return of signals between the sensor and the plurality of wireless communication transceivers coupled to the vehicle;
  the controller is operable to receive data from the sensor when the storage container is within an effective range of the vehicle and utilize the data when the storage container is outside of the effective range of the vehicle to determine a last position of the storage container;
  the electronic device comprises a portable electronic device;
  the controller is configured to prompt the electronic device to issue the alerts to the user based on data received from the sensor indicating that the position of the storage container exceeds a predetermined distance from the vehicle; and
  the controller is configured to prompt the electronic device to issue the alert to the user based on data received from the sensor indicating that the storage container is outside of the vehicle.

According to a second aspect of the present disclosure, a vehicle system includes a roof panel that is operable between an assembled condition, wherein the roof panel is assembled to the vehicle, and a removed condition, wherein the roof panel is not assembled to the vehicle. A storage bag is operable to hold the roof panel when the roof panel is in the removed condition. The vehicle system further includes a sensing system comprising a first sensor coupled to the storage bag, a second sensor coupled to the roof panel, and a third sensor coupled to the vehicle. The vehicle system includes an electronic device for communicating with the user and a controller that is in communication with the sensing system. The controller is configured to receive data from the sensing system relating to the position of at least one of the first sensor and the second sensor and is further configured to prompt the electronic device to issue an alert based on the received data.

Embodiments relating to the second aspect of the present disclosure may include any one or a combination of the following features:
  the sensing system comprises a plurality of wireless communication transceivers including at least the first sensor, the second sensor, and the third sensor;
  the controller is configured to determine the position of at least one of the first sensor and the second sensor through triangulation of the signal strength and time to return of signals between a number of the plurality of wireless communication transceivers in the sensing system;
  the electronic device comprises a portable electronic device;
  the controller is configured to prompt the electronic device to issue the alert based on data received from the first sensor indicating that the position of the storage bag exceeds a predetermined distance from the vehicle;
  the controller is configured to prompt the electronic device to issue the alert when data received from the second sensor indicates that the roof panel is in the assembled condition and data received from the first sensor indicates that the storage bag is outside the vehicle;
  the controller is configured to prompt the electronic device to issue the alert based on data received from the first sensor and the second sensor relating to the position of the first sensor relative to the position of the second sensor;
  the data received from the first sensor and the second sensor relating to the position of the first sensor relative to the second sensor indicates that the roof panel is not disposed within the storage bag;
  the storage bag comprises a rubberized base;
  the first sensor is coupled to the rubberized base of the storage bag;
  the storage bag is configured to be coupled to a rear side of a seatback disposed within the vehicle; and
  the rubberized base of the storage bag is configured to rest on a floor of the vehicle when the storage bag is coupled to the rear side of the seatback within the vehicle.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Figure 1:
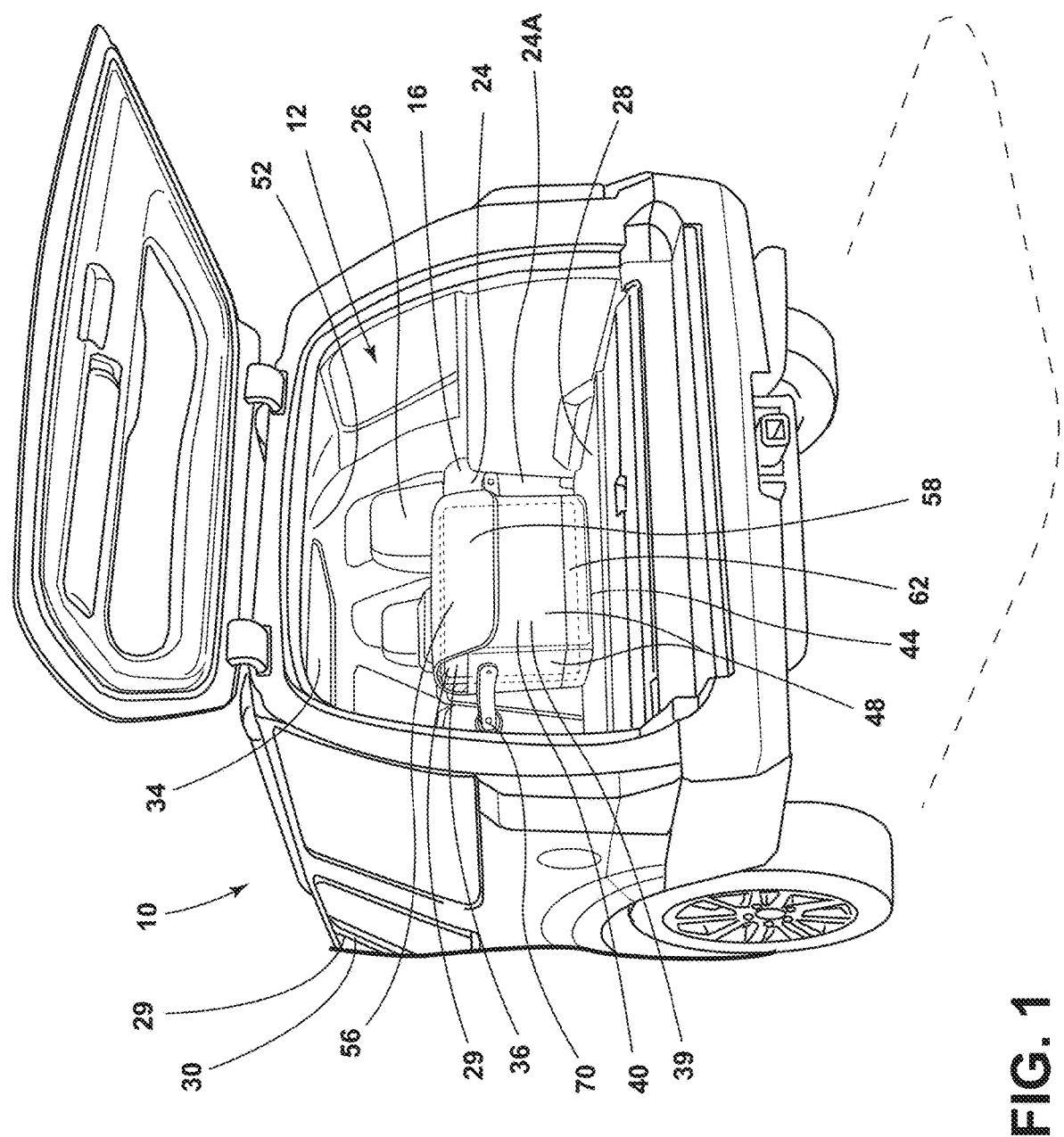
FIG. 1 is a perspective view of a vehicle, illustrating a roof panel disposed within a storage bag that is coupled to a rear side of a seatback in the vehicle, according to one embodiment.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In reference to FIGS. 1-8, a vehicle system includes a roof panel 36 that is operable between an assembled condition, wherein the roof panel 36 is assembled to the vehicle 10, and a removed condition, wherein the roof panel 36 is not assembled to the vehicle 10. A storage bag 40 is operable to hold the roof panel 36 when the roof panel 36 is in the removed condition. A sensing system 104 includes a first sensor 108 that is coupled to the storage bag 40, a second sensor 108 that is coupled to the roof panel 36, and a third sensor 108 that is coupled to the vehicle 10. The vehicle system includes an electronic device 116 for communicating with a user, and further includes a controller 124 that is in communication with the sensing system 104. The controller 124 is configured to receive data from the sensing system 104 relating to the position of at least one of the first sensor 108 and the second sensor 108, and prompts the electronic device 116 to issue an alert based on the received data.

Referring now to FIG. 1, the vehicle 10 includes a vehicle interior 12. As shown, the vehicle 10 may include at least one seating assembly 16. In various embodiments, the seating assembly 16 may include a seat base (not shown) and a seatback 24 coupled to the seat base. In some embodiments, a headrest 26 may be coupled to the seatback 24. In some embodiments, the vehicle 10 may include rear seating assemblies 16 that are proximate to a trunk area of the vehicle 10. The seating assemblies 16 may be coupled to a floor 28 of the vehicle 10, in various embodiments, as shown in FIG. 1. The floor 28 may extend generally vehicle-rearward of the rear seating assemblies 16 of the vehicle 10, such that, in some embodiments, the rearwardly-extending floor 28 constitutes a base portion of the trunk area of the vehicle 10.

Figure 4:
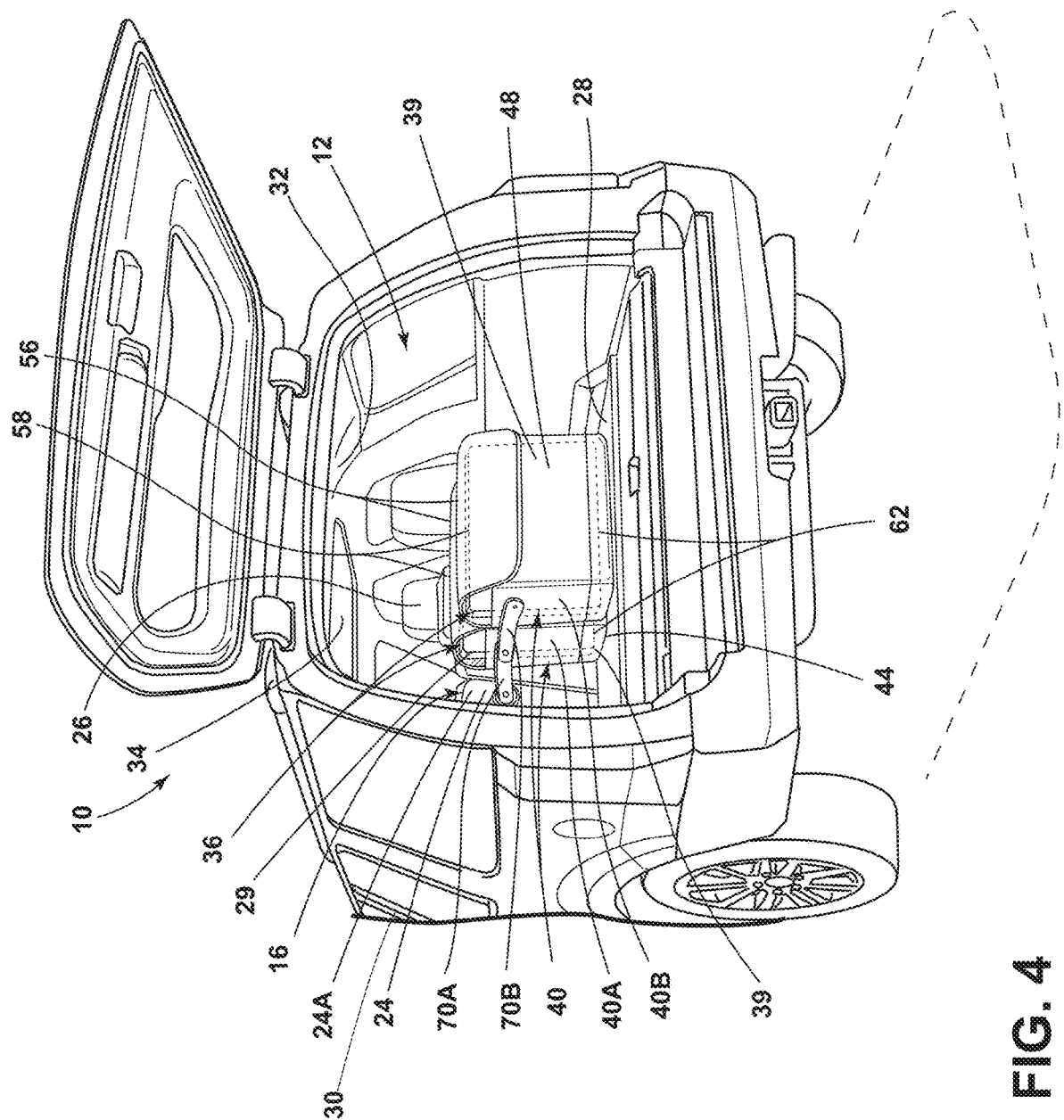
FIG. 4 is a perspective view of a vehicle, illustrating a first storage bag coupled to a rear side of a seatback of the vehicle and a second storage bag coupled to the first storage bag, according to one embodiment.
Figure 5:
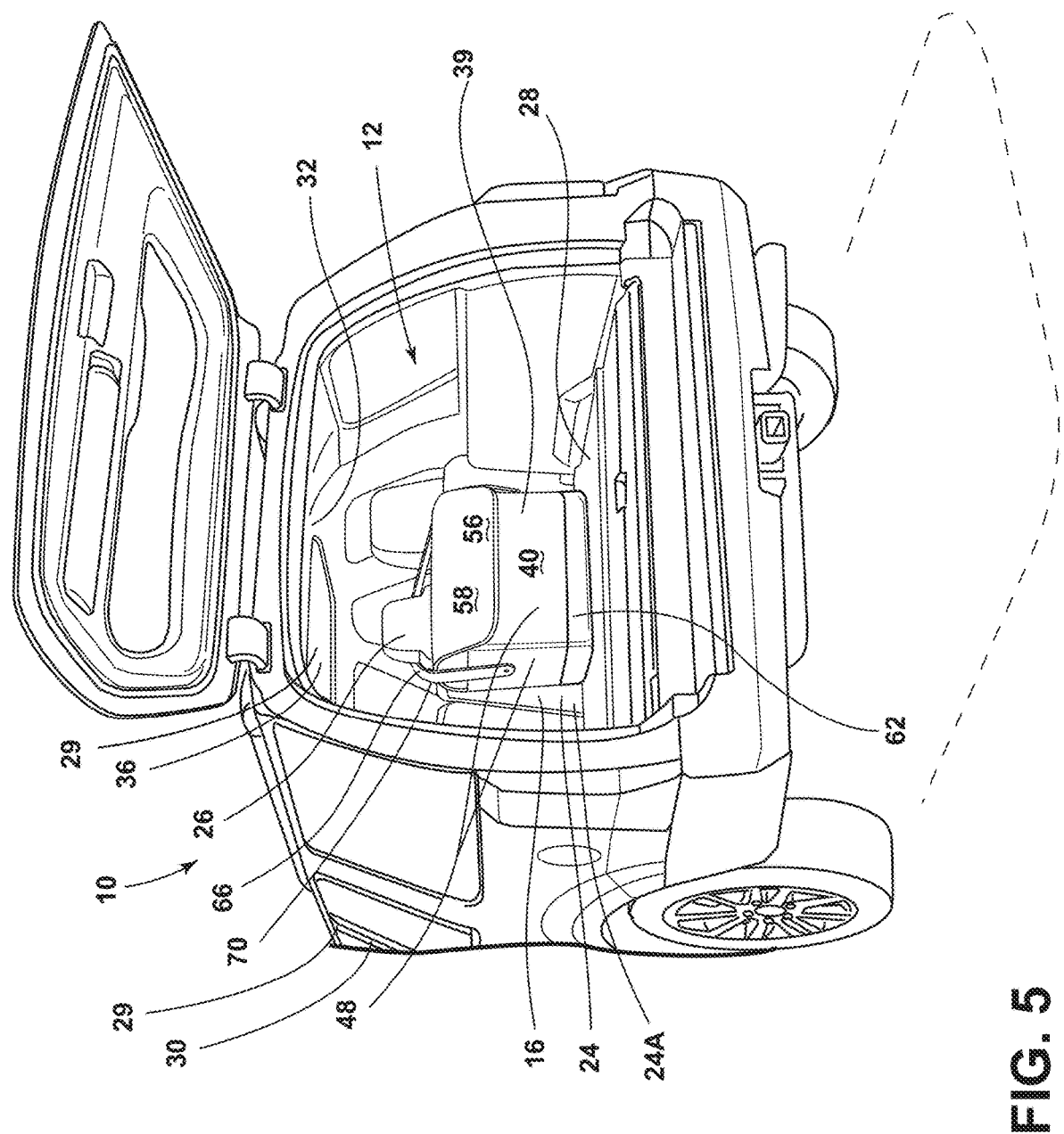
FIG. 5 is a perspective view of a vehicle, illustrating the storage bag secured in a designated position on the rear side of the seatback of the vehicle by a strap that is secured to a head rest coupled to the seatback in the vehicle, according to one embodiment.

Referring now to FIGS. 1, 4, and 5, in various embodiments, the vehicle 10 may include various vehicle components 29. For example, in some embodiments, the vehicle 10 may include one or more roof panels 36. In various embodiments, the one or more roof panels 36 may be removably coupled to a roof 32 of the vehicle 10. As such, in some embodiments, the one or more roof panels 36 may be operable between an assembled condition, as shown in FIG. 5, wherein the illustrated roof panel 36 is assembled to the vehicle 10, and a removed condition, as shown in FIGS. 1 and 4, wherein the one or more roof panels 36 are not assembled to the vehicle 10. The roof 32 of the vehicle 10 may define an aperture 34 when the one or more roof panels 36 are in the removed condition. It is contemplated that the one or more roof panels 36 may be coupled to various other portions of the vehicle 10 in the alternative, or in addition, to the roof 32 (e.g., vehicle pillars, cross members, etc.).

Referring still to FIGS. 1, 4, and 5, in various embodiments, the vehicle 10 may additionally or alternatively include vehicle components 29 other than the one or more roof panels 36. For example, in various embodiments, the vehicle 10 may include a door 30. In some embodiments, the door 30 may be removably coupled to the vehicle 10. As such, in some embodiments, the door 30 may be operable between an assembled condition, wherein the door 30 is assembled to the vehicle 10, and a removed condition, wherein the door 30 is not assembled to the vehicle 10. It is contemplated that the door 30 may be operable to open and close relative to the vehicle 10 while in the assembled condition. It is contemplated that the vehicle 10 may include various other vehicle components 29.

Figure 3:
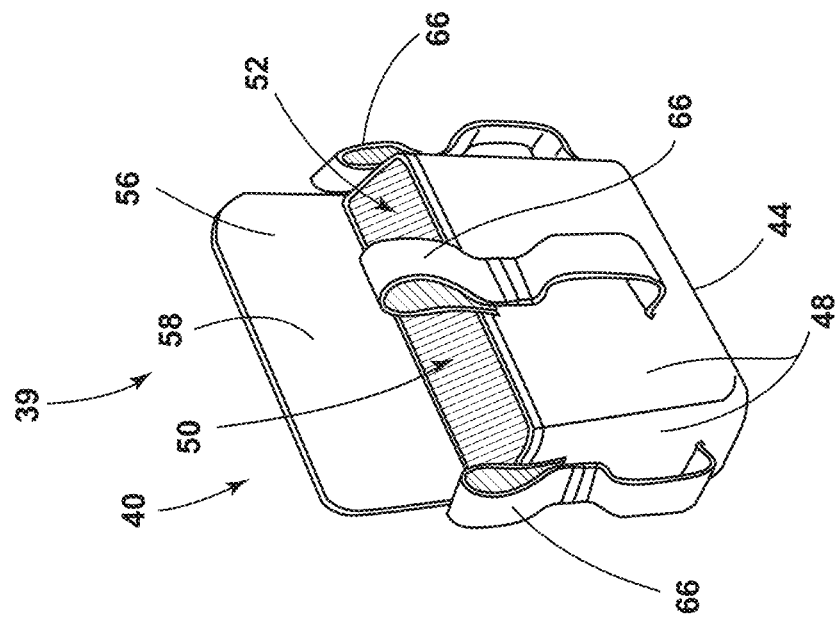
FIG. 3 is a perspective view of the storage bag, illustrating a plurality of straps coupled to the storage bag, according to one embodiment.
Figure 2:
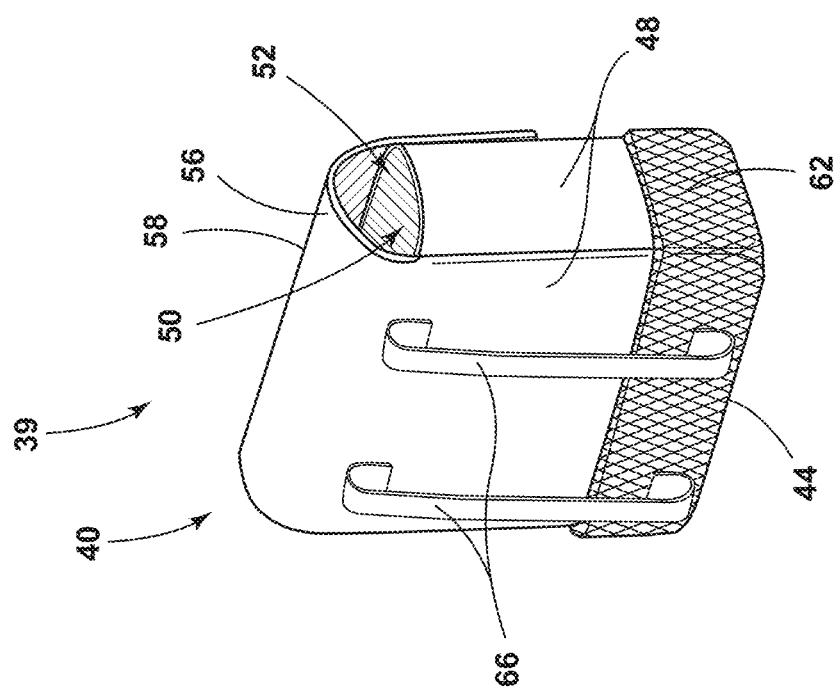
FIG. 2 is a perspective view of the storage bag, illustrating backpack style straps, and a cover flap generally covering an opening of the storage bag, according to one embodiment.

Referring now to FIGS. 1-7, in various embodiments, the vehicle 10 may include a storage container 39 that is operable to hold one or more of the vehicle components 29. For example, in some embodiments, the storage container 39 may be operable to hold the door 30 of the vehicle 10 when the door 30 is in the removed condition. In various embodiments, the storage container 39 may be a storage bag 40 that is operable to hold one or more vehicle components 29. For example, in some embodiments, the storage bag 40 may be operable to hold the one or more roof panels 36 when the one or more roof panels 36 are in the removed condition, as shown in FIGS. 1 and 4. As illustrated in FIGS. 2 and 3, the storage bag 40 may include a bottom 44 and sides 48 extending from the bottom 44. The sides 48 may terminate at an opening 52 of the storage bag 40. The bottom 44 and sides 48 of the storage bag 40 may generally define a cavity 50 configured to hold the one or more roof panels 36. In various embodiments, the storage bag 40 may include a cover 56 that is configured to generally cover the opening 52 of the storage bag 40. As shown in FIGS. 1-5, in some embodiments, the cover 56 may be configured as a flap 58 that is coupled to at least one of the sides 48 of the storage bag 40 and is operable to articulate to generally cover the opening 52 of the storage bag 40. It is contemplated that, in various embodiments, the storage bag 40 may include at least one of a variety of types of covers 56 that are configured to cover the opening 52 of the storage bag 40. It is further contemplated that, in some embodiments, the storage bag 40 may include a variety of features configured to generally close the opening 52 of the storage bag 40, as desired (e.g., a zipper, a hook and loop fastener, snaps, buttons, etc.).

Figure 7:
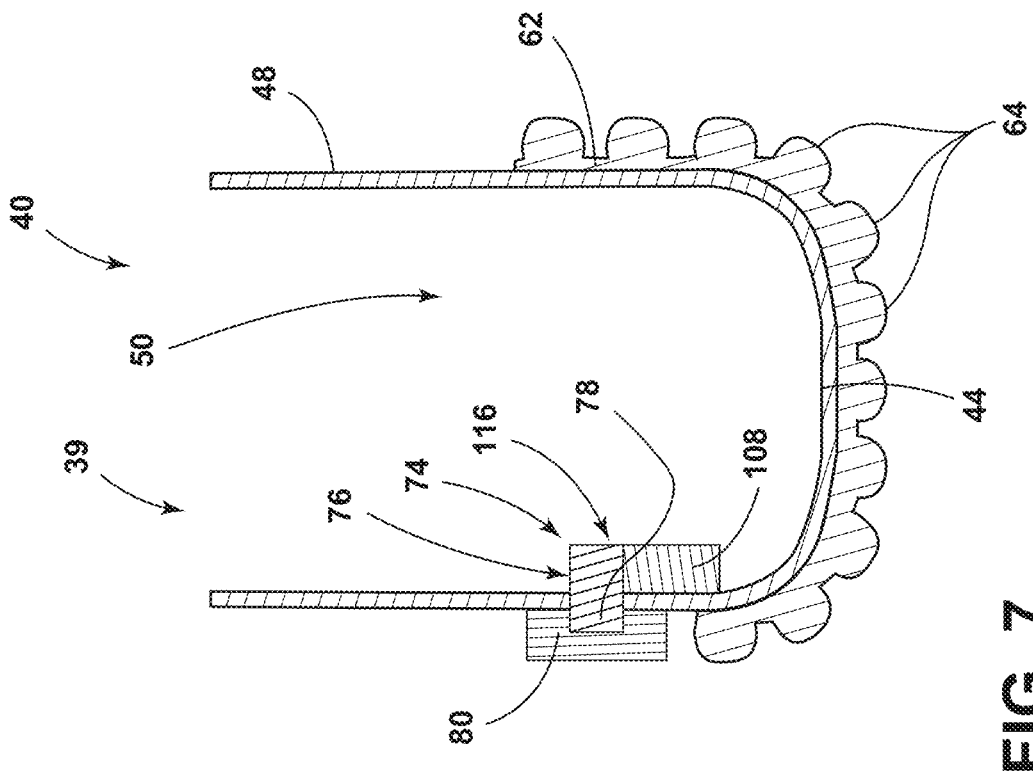
FIG. 7 is a cross-sectional view of the storage bag taken through line VII-VII in FIG. 6, illustrating the panel, a sound exciter, and a sensor coupled to the storage bag, according to one embodiment.
Figure 6:
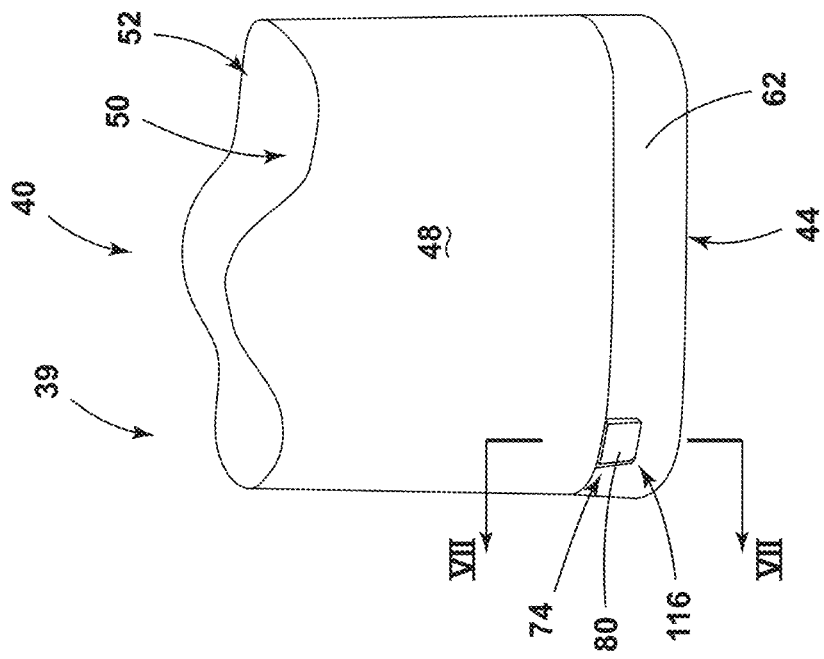
FIG. 6 is a perspective view of the storage bag, illustrating a panel disposed proximate to a rubberized base of the storage bag, according to one embodiment.

Referring now to FIGS. 2, 6, and 7, in various embodiments, the storage bag 40 may include a reinforced base 62. In various embodiments, the reinforced base 62 may include the bottom 44 of the storage bag 40. In other words, in some embodiments, the bottom 44 of the storage bag 40 may be at least one portion of the storage bag 40 that is physically reinforced by the reinforced base 62. As illustrated in FIGS. 2, 6, and 7, in some embodiments, the reinforced base 62 of the storage bag 40 may include the bottom 44 and at least a lower portion of the sides 48 proximate to the bottom 44 of the storage bag 40. In various embodiments, the reinforced base 62 of the storage bag 40 may be formed of a different material than the remainder of the storage bag 40. For example, the reinforced base 62 of the storage bag 40 may be rubberized, while other portions of the storage bag 40 may be comprised of a fabric, such as cloth. The reinforced base 62 may increase the structural integrity of the storage bag 40, in some embodiments.

Referring now to FIGS. 2 and 3, in some embodiments, the storage bag 40 may include one or more straps 66. For example, as shown in FIG. 2, in some embodiments, the storage bag 40 may include backpack-style straps 66, which may enable a user to more conveniently carry the one or more roof panels 36 within the storage bag 40. Further, as shown in FIG. 3, in some embodiments, the storage bag 40 may include one or more handle-style straps 66 and/or various other types of straps 66 that may improve user maneuverability of the storage bag 40 and/or may enable a user to conveniently secure the storage bag 40 to various portions of the vehicle 10.

Referring now to FIGS. 1, 4, and 5, in various embodiments, the vehicle 10 may include a designated position for the storage container 39. 40. In other words, there may be a designated position within the vehicle 10 that is configured to receive and/or secure the storage container 39. In various embodiments, the vehicle 10 may include a designated position for the storage bag 40. In some embodiments, the storage bag 40 may be coupled to the seatback 24 of the seating assembly 16 within the vehicle 10 when the storage bag 40 is in the designated position. For example, as shown in FIGS. 1 and 5, the storage bag 40 may be coupled to the rear side 24A of the seatback 24 when the storage bag 40 is in the designated position within the vehicle 10. In such embodiments, the bottom 44 of the storage bag 40 may be configured to rest on the floor 28 of the vehicle 10 that is generally vehicle-rearward of the seating assembly 16 that the storage bag 40 is coupled to while in the designated position. In some embodiments, the reinforced base 62 may provide traction between the floor 28 and the storage bag 40 to aid in retaining the storage bag 40 in the designated position during use of the vehicle 10. For example, as shown in FIG. 7, in some embodiments, the reinforced base 62 may include one or more stabilizers 64 that are configured to frictionally engage with the floor 28 and/or various other portions of the vehicle 10 when the storage bag 40 is in the designated position within the vehicle 10. It is contemplated that, in various embodiments, the one or more stabilizers 64 may be at least one of a variety of features configured to aid in retaining the reinforced base 62 of the storage bag 40 in the designated position within the vehicle 10 (e.g., nubs, ridges, hook and loop fasteners, etc.). It is further contemplated that the designated position for the storage bag 40 within the vehicle 10 may be in various locations within the vehicle 10.

Referring still to FIGS. 1, 4, and 5, in various embodiments, the storage bag 40 may include an attachment feature 70 that is configured to secure the storage bag 40 to one or more portions of the vehicle 10 when the storage bag 40 is in the designated position within the vehicle 10. In various embodiments, the attachment feature 70 may include at least one of a variety of features configured to couple the storage bag 40 to one or more portions of the vehicle 10 while in the designated position (e.g., snaps, hook and loop fastener, buckles, straps, matingly-engageable fasteners, zippers, etc.). For example, as shown in FIG. 1, in some embodiments, the attachment feature 70 includes a snap configured to correspond with a fastener coupled to the rear side 24A of the seatback 24, such that engaging the snap coupled to the storage bag 40 with the fastener coupled to the seatback 24 secures the storage bag 40 in the designated position within the vehicle 10. In some examples, as shown in FIG. 5, the attachment feature 70 may include the strap 66 coupled to the storage bag 40. In the example depicted in FIG. 5, the strap 66 secures the storage bag 40 in the designated position via securement about the headrest 26 coupled to the seatback 24 of the seating assembly 16 within the vehicle 10. In some embodiments, the vehicle 10 may include multiple removable roof panels 36 and multiple storage bags 40 for holding the roof panels 36. Accordingly, as shown in FIG. 4, in some embodiments, a first storage bag 40A may be coupled to a portions of the vehicle 10, here, the rear side 24A of the seatback 24, via a first attachment feature 70A, while the first storage bag 40A is in the designated position within the vehicle 10, and a second storage bag 40B may be coupled to the first storage bag 40A via a second attachment feature 70B, while the second storage bag 40B is in the designated position within the vehicle 10. It is contemplated that, in some embodiments, the vehicle 10 may include multiple designated positions for multiple storage bags 40, wherein the storage bags 40 are not directly coupled to one another.

Figure 8:
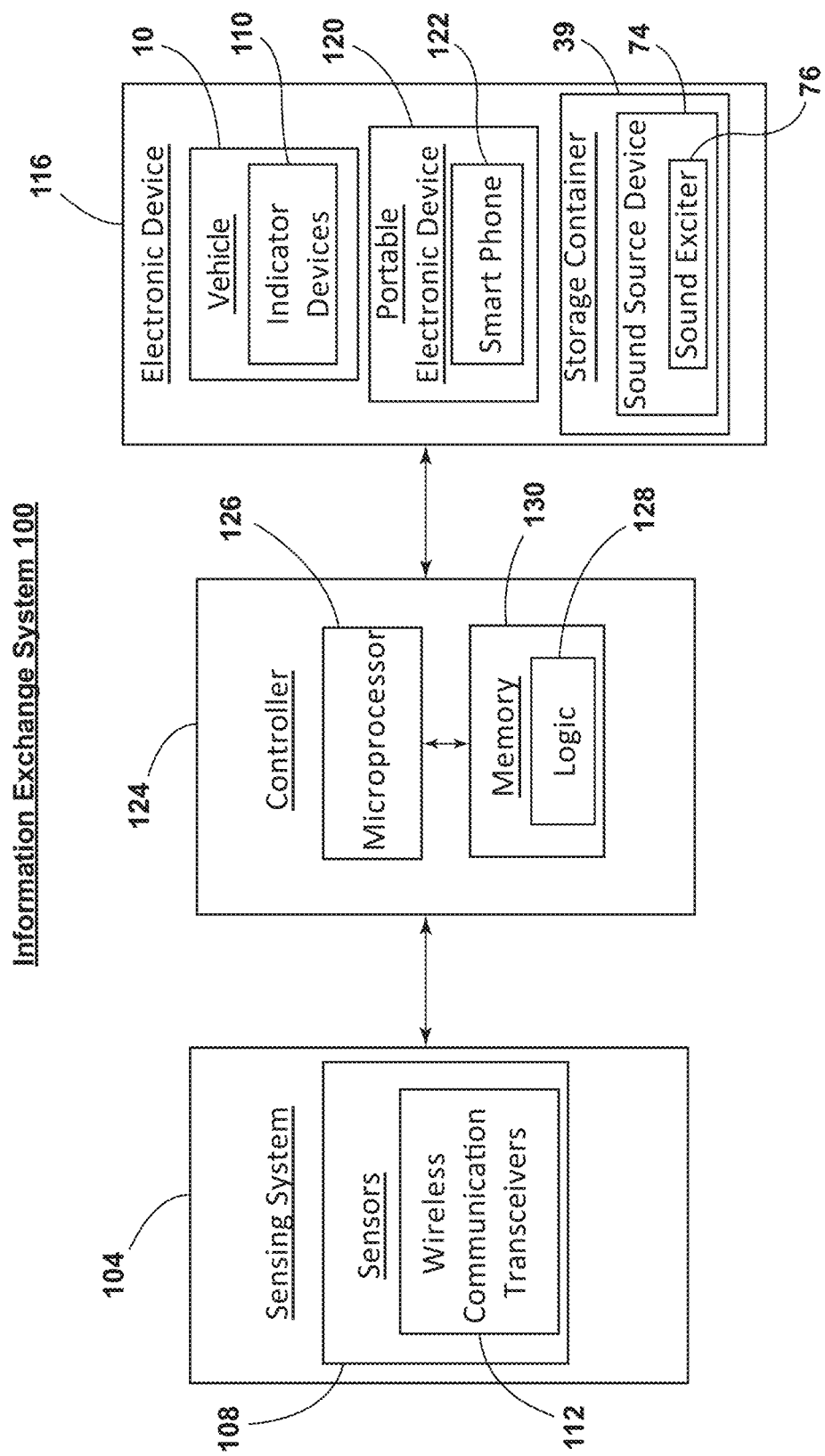
FIG. 8 is a block diagram of a controller in connection with a sensing system and an electronic device, according to one embodiment.

Referring now to FIGS. 6-8, in various embodiments, a sound source device 74 may be coupled to the storage container 39. In some embodiments, the sound source device 74 may be coupled to the storage bag 40. In various embodiments, the sound source device 74 may include one or more of a variety of devices configured to produce sound (e.g., a speaker). In some embodiments, the sound source device 74 may be a sound exciter 76. The sound exciter 76 may include a sound exciter coil 78 and a generally rigid panel 80. The sound exciter coil 78 may be coupled to the panel 80, such that during operation of the sound exciter 76, the sound exciter coil 78 imparts vibration in to the panel 80 to produce sound. As shown in FIGS. 6 and 7, in some embodiments, the sound exciter 76 may be coupled to the storage bag 40 in a position that is proximate to the reinforced base 62 of the storage bag 40. In some embodiments, the sound exciter 76 may be coupled to at least one of the sides 48 of the storage bag 40 generally proximate to a portion of the reinforced base 62 that is distal from the bottom 44 of the storage bag 40, as shown in FIGS. 6 and 7. In some embodiments, the panel 80 and the reinforced base 62 may be formed with the storage bag 40 via a two shot over-molded manufacturing process. In such embodiments, the reinforced base 62 of the storage bag 40 may be formed of a generally less rigid material than the panel 80, which may be formed of a generally more rigid material relative to the reinforced base 62. For example, in some embodiments, the reinforced base 62 may be a relatively soft rubberized base that may be suitable for frictionally engaging various portions of the vehicle 10 to retain the storage bag 40 in the designated position within the vehicle 10, while the panel 80 of the sound exciter 76 may be formed of a more rigid plastic, which may be better suited for transmission of sound from the sound exciter 76. As shown in FIG. 7, in various embodiments, the generally rigid panel 80 may be spaced-apart from the adjacent reinforced base 62, in order to avoid undesired dampening of sound that may occur due to the panel 80 of the sound exciter 76 being in contact with the relatively soft reinforced base 62 of the storage bag 40. It is contemplated that the sound source device 74 and/or the sound exciter 76 may be coupled to various portions of the storage bag 40, in various embodiments.

In reference to FIGS. 1-8, in various embodiments, the vehicle 10 may include an information exchange system 100. The information exchange system 100 may include the electronic device 116. In some embodiments, the electronic device 116 may be a portion or component of the vehicle 10. For example, in some embodiments, the electronic device 116 may include one or more indicator devices 110 of the vehicle 10. The indicator devices 110 of the vehicle 10 may be at least one of a variety of vehicle devices that may include, but is not limited to, a human machine interface (HMI) of the vehicle 10, a horn of the vehicle, vehicle lights and/or emergency flashers, vehicle speakers, and/or various other features of the vehicle 10.

In some embodiments, the electronic device 116 may be a portable electronic device 120. In various embodiments, the portable electronic device 120 may be generally distinct from the vehicle 10 and the indicator devices 110 of the vehicle 10. In some embodiments, the portable electronic device 120 may be configured to be carried by a user. For example, in some embodiments, the portable electronic device 120 may be a smart phone 122 or other similar device (e.g., a smartwatch, a laptop, a tablet, etc.).

In some embodiments, the electronic device 116 may be a component of the storage container 39. In some embodiments, the electronic device 116 may be a component of the storage bag 40. For example, the electronic device 116 may include the sound source device 74. In some examples, the electronic device 116 may include the sound exciter 76 coupled to the storage container 39 and/or the storage bag 40. It is contemplated that, in some embodiments in which the electronic device 116 is a component of the storage container and/or the storage bag 40, the electronic device 116 may include devices other than the sound source device 74 and/or the sound exciter 76 (e.g., display screen, etc.).

In further reference to FIG. 8, in various embodiments, the electronic device 116 may be configured to issue an alert. In some embodiments, in which the electronic device 116 is a portion or feature of the vehicle 10, the vehicle 10 may issue the alert via one or more of the indicator devices 110. The vehicle 10 may issue at least one of a variety of types of alerts that may include, but is not limited to, visual alerts, tactile alerts, audible alerts, and/or a combination thereof. For example, in some embodiments, the HMI of the vehicle 10 may issue a visual alert on a display screen of the HMI. Further, in some embodiments, the vehicle 10 may issue an auditory alert via the speakers of the vehicle 10. It is contemplated that various other features of the vehicle 10 may issue alerts in addition to, or alternatively to, the above-mentioned features (e.g., steering wheel vibrations, horn honking, lights flashing, etc.).

In some embodiments, wherein the electronic device 116 includes the portable electronic device 120, the portable electronic device 120 may issue an alert. It is contemplated that, in various embodiments, the portable electronic device 120 may be operable to issue at least one of a variety of types of alerts that may include, but is not limited to, tactile alerts, visual alerts, auditory alerts, and/or a combination thereof. For example, in some embodiments, the portable electronic device 120 may be the smart phone 122 that is configured to issue a tactile alert (e.g., vibration), a visual alert (e.g., via a display screen), and an auditory alert (e.g., via a speaker).

In some embodiments, in which the electronic device 116 is a component of the storage container 39 and/or the storage bag 40, such as the sound source device 74, the component of the storage container 39 and/or the storage bag 40 may be operable to issue an alert. For example, the sound exciter 76 coupled to the storage bag 40 may be operable to issue an audible alert. It is contemplated that, in some embodiments, the storage container 39 and/or the storage bag 40 may include other electronic devices 116 operable to issue various other types of alerts.

Referring still to FIG. 8, in various embodiments, the information exchange system 100 may include the sensing system 104. The sensing system 104 may include a plurality of sensors 108. The sensors 108 may be configured to communicate with the electronic device 116. It is contemplated that, in some embodiments, the sensors 108 may be configured to send data to various electronic devices 116. It is further contemplated that, in some embodiments, the electronic device 116 may include one or more sensors 108.

In some embodiments, a number of the plurality of sensors 108 may be wireless communication transceivers 112 configured to interact with the electronic device 116 and/or other devices over a wireless signal (e.g., radio frequency). In a specific example, the wireless communication transceivers 112 may be configured to communicate via Bluetooth™ low energy signals. It will be appreciated that the wireless communication transceivers 112 may utilize other forms of wireless communication, such as Wi-Fi™, in some embodiments.

In various embodiments, one or more of the plurality of sensors 108 may be coupled to the vehicle 10. For example, one or more sensors 108 may be coupled to the seating assemblies 16 disposed within the vehicle 10. It is contemplated that the sensors 108 may be coupled to various portions of the vehicle 10, in various embodiments (e.g., the roof 32, the vehicle exterior, etc.). In various embodiments, one or more of the plurality of sensors 108 may be coupled to non-vehicle components, various vehicle components 29, and/or other accessories of the vehicle 10 that may be removed from the vehicle 10 by the user, in addition to the sensors 108 coupled to the vehicle 10. For example, in some embodiments, one or more sensors 108 may be coupled to the storage container 39, the one or more roof panels 36, and the portable electronic device 120. In a non-limiting example of the sensing system 104, a first sensor 108 may be coupled to the storage bag 40, a second sensor 108 may be coupled to the roof panel 36, and a third sensor 108 may be coupled to the vehicle 10.

With further reference to FIG. 8, in various embodiments, the information exchange system 100 of the vehicle 10 may include the controller 124. The controller 124 may be configured with a microprocessor 126 to process logic 128 stored in a memory 130 to make determinations, thereof. It should be appreciated that the controller 124 may be a stand-alone, dedicated controller or may be a shared controller integrated with other control functions.

In various embodiments, the controller 124 may be operable to receive data from the plurality of sensors 108 and/or the electronic device 116. The controller 124 may utilize the received data to make various determinations. In some embodiments, the controller 124 may utilize received data to determine the position of one or more of the sensors 108 and/or the electronic device 116. In some embodiments, the position of the one or more sensors 108 and/or the electronic device 116 may be determined through triangulation of the signal strength and time to return signals between the plurality of sensors 108 and/or the electronic device 116. In some embodiments, the sensors 108 may have an effective range of communication outside of which data cannot be effectively communicated between the sensors 108 and/or the electronic device 116. For example, in some embodiments, one or more sensors 108 coupled to the storage bag 40 may be out of range of sensors 108 coupled to the vehicle 10 and/or the electronic device 116 when the vehicle 10 and/or the electronic device 116 are more than 600 feet away from the one or more sensors 108 coupled to the storage bag 40. In some embodiments, the controller 124 may be configured to utilize data received from the sensors 108 when the sensors 108 were previously within their effective range to determine a last position of the sensors 108.

In various embodiments, the controller 124 may utilize the received data to determine the positions of the sensors 108 and/or the electronic device 116 relative to one another. For example, in some embodiments, the controller 124 may be configured to determine the position of a first sensor 108 relative to the position of a second sensor 108. It follows, then, that if the first sensor 108 is coupled to the storage bag 40 and the second sensor 108 is coupled to the roof panel 36, the controller 124 may be operable to determine the position of the storage bag 40 relative to the position of the roof panel 36. In this way, the controller 124 may be configured to determine the position of various vehicle components 29 (i.e. the door 30, the roof panel 36, etc.) and accessories, such as the storage container 39, as well as the vehicle 10 and/or the electronic device 116 in general and/or relative to one another.

In some embodiments, the controller 124 may use received data to determine whether the position of the vehicle component 29, the storage container 39, and/or the electronic device 116 has exceeded a predetermined distance from the vehicle 10. For example, the controller 124 may determine that the position of the storage bag 40 has exceeded a predetermined distance from the vehicle 10 (e.g., 250 feet) based on received data. In some embodiments, the controller 124 may use received data to determine whether a vehicle component and/or the electronic device 116 is positioned inside or outside of the vehicle 10. For example, the controller 124 may determine that the storage bag 40 is positioned outside of the vehicle 10 based on data received from a sensor coupled to the storage bag 40. In some embodiments, the controller 124 may use received data to determine whether the one or more roof panels 36 are in the assembled condition or the removed condition relative to the vehicle 10. In some embodiments, the controller 124 may use received data to determine whether the one or more roof panels 36 are disposed within the storage bag 40. It is contemplated that, in various embodiments, the controller 124 may be operable to make a variety of other determinations based on data received from the sensors 108 and/or the electronic device 116.

Referring still to FIG. 8, in various embodiments, the controller 124 may be configured to prompt the electronic device 116 to execute an action as a result of the controller 124 making a determination based on received data. For example, in various embodiments, the controller 124 may be configured to prompt the electronic device 116 to issue an alert. It is contemplated that, in some embodiments, the controller 124 may prompt the electronic device 116 to execute an action other than issuing an alert. For example, in some embodiments, in which the electronic device 116 is a portion or component of the vehicle 10, the vehicle 10 may be prompted to lock the doors 30 in response to a determination being made by the controller 124.

In some embodiments, the controller 124 may prompt the electronic device 116 to issue an alert to the user based on a determination indicating that the position of the vehicle component 29, the storage container 39, and/or the electronic device 116 has exceeded a predetermined distance from the vehicle 10. For example, the electronic device 116 may be prompted to issue the alert based on a determination that the position of the storage bag 40 exceeds a predetermined distance from the vehicle 10. In some embodiments, the controller 124 may prompt the electronic device 116 to issue an alert to the user based on a determination indicating that the vehicle component 29, the storage container 39, and/or the electronic device 116 is positioned outside of the vehicle 10. For example, the sound exciter 76 coupled to the storage bag 40 may be prompted to issue an auditory alert based on a determination that the storage bag 40 is positioned outside of the vehicle 10.

In some embodiments, the controller 124 may prompt the electronic device 116 to issue an alert to the user based on a determination indicating that the vehicle component 29 is in the assembled condition. For example, the HMI of the vehicle 10 may display an alert communicating to the user that the roof panel 36 is in the assembled condition and that the storage bag 40 is outside of the vehicle 10. In some embodiments, the controller 124 may prompt the electronic device 116 to issue an alert to the user based on a determination indicating that the roof panel 36 is not disposed within the storage bag 40. In some embodiments, the controller 124 may prompt the electronic device 116 to issue an alert to the user based on a determination relating to the position of the vehicle 10 and/or a component of the vehicle 10 relative to the electronic device 116. For example, the sound source device 74 may be configured to issue an auditory alert based on the sensed position of the storage bag 40 relative to the position of the portable electronic device 120.

In some embodiments, the controller 124 may prompt the electronic device 116 to issue an alert to the user based on a determination indicating a change in position of the vehicle component 29, the storage container 39, and/or the electronic device 116 relative to one another, and/or the vehicle 10. For example, in some embodiments, the sound source device 74 may be prompted to issue an auditory alert based on a sensed change in position of the storage bag 40 when the portable electronic device 120 is a predetermined distance away from the storage bag 40. It is contemplated that the controller 124 may prompt the issuance of an alert based on various other determinations, in some embodiments.

In a non-limiting example, the vehicle component storage system for the vehicle 10 may function in operation as follows: The user of the vehicle 10 removes the roof panel 36 from the roof 32 of the vehicle 10 and stores the roof panel 36 within the cavity 50 of the storage bag 40 before driving the vehicle 10 to the user's destination. The storage bag 40 is coupled to the rear side 24A of the seatback 24 within the vehicle 10, while the user is driving the vehicle 10 to the user's destination, in order to generally protect the roof panel 36 while the roof panel 36 is in the removed condition. Upon reaching the destination, the user forgets to lock the vehicle 10 before walking away from the vehicle 10. While the user is away from the vehicle 10, the storage bag 40 and the roof panel 36 disposed therein are removed, e.g., stolen, from the unlocked vehicle 10. When the storage bag 40 and the roof panel 36 are removed from the vehicle 10, the sensors 108 coupled to the roof panel 36, the vehicle 10, and the storage bag 40 sense the changes in position of the storage bag 40 and the roof panel 36 relative to the vehicle 10. The controller 124 then prompts the user's smart phone 122 and the sound exciter 76 coupled to the storage bag 40 to issue alerts, based on data received from the sensors 108 and the user's smart phone 122 that enabled the controller 124 to determine that the storage bag 40 and the roof panel 36 were removed from the vehicle 10 while the user's smart phone 122 was more than a predetermined distance away from the vehicle 10.

The present disclosure provides a variety of advantages. First, the storage bag 40 may allow for convenient and secure storage of the one or more roof panels 36 when the one or more roof panels 36 are in the removed condition. Second, the information exchange system 100 of the vehicle 10 may determine the position of various vehicle components 29, the storage container 39 and/or the electronic device 116 and may issue alerts to the user based on the determined positions. Third, the sound source device 74 coupled to the storage bag 40 may allow an alert to be issued at the location of the storage bag 40 when the storage bag 40 is isolated from the vehicle 10.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle body panel component storage system for a vehicle, comprising:
    a vehicle body panel component;
    a storage container configured to hold the vehicle body panel component;
    a sensing system, comprising:
        a first communication device coupled to the storage container;
        a second communication device coupled to the vehicle body panel component; and
        a third communication device coupled to the vehicle;
    an electronic device for communicating with a user; and
    a controller configured to prompt the electronic device to issue an alert to the user based on data received from the sensing system relating to the position of at least one of the first communication device and the second communication device relative to the vehicle.

2. The vehicle body panel component storage system of claim 1, wherein at least one of the first communication device and the second communication device is a wireless communication transceiver operable to communicate with a plurality of wireless communication transceivers coupled to the vehicle.

3. The vehicle body panel component storage system of claim 2, wherein the position of the storage container relative to the vehicle is determined through triangulation of the signal strength and time to return of signals between at least one of the first communication device, the second communication device, and the plurality of wireless communication transceivers coupled to the vehicle.

4. The vehicle body panel component storage system of claim 3, wherein the controller is operable to receive data from the first communication device when the storage container is within an effective range of the vehicle and utilize the data when the storage container is outside of the effective range of the vehicle to determine a last position of the storage container.

5. The vehicle body panel component storage system of claim 1, wherein the electronic device comprises a portable electronic device.

6. The vehicle body panel component storage system of claim 1, wherein the controller is configured to prompt the electronic device to issue the alert to the user based on data received from the first communication device indicating that the position of the storage container exceeds a predetermined distance from the vehicle.

7. The vehicle body panel component storage system of claim 1, wherein the controller is configured to prompt the electronic device to issue the alert to the user based on data received from the first communication device indicating that the storage container is outside of the vehicle.

8. A vehicle system, comprising:
    a roof panel operable between an assembled condition, wherein the roof panel is assembled to the vehicle, and a removed condition, wherein the roof panel is not assembled to the vehicle;
    a storage bag operable to hold the roof panel when the roof panel is in the removed condition;
    a sensing system, comprising:
        a first communication device coupled to the storage bag;
        a second communication device coupled to the roof panel; and
        a third communication device coupled to the vehicle;
    an electronic device for communicating with a user; and a controller in communication with the sensing system and configured to:

receive data from the sensing system relating to the position of at least one of the first communication device and the second communication device; and prompt the electronic device to issue an alert based on the received data.

9. The vehicle system of claim 8, wherein the sensing system comprises a plurality of wireless communication transceivers including at least one of the first communication device, the second communication device, and the third communication device.

10. The vehicle system of claim 9, wherein the controller is configured to determine the position of at least of the first communication device and the second communication device through triangulation of the signal strength and time to return of signals between at least one of the first communication device, the second communication device, and a number of the plurality of wireless communication transceivers in the sensing system.

11. The vehicle system of claim 8, wherein the electronic device comprises a portable electronic device.

12. The vehicle system of claim 8, wherein the controller is configured to prompt the electronic device to issue the alert based on data received from the first communication device indicating that the position of the storage bag exceeds a predetermined distance from the vehicle.

13. The vehicle system of claim 8, wherein the controller is configured to prompt the electronic device to issue the alert when data received from the second communication device indicates that the roof panel is in the assembled condition and data received from the first communication device indicates that the storage bag is outside of the vehicle.

14. The vehicle system of claim 8, wherein the controller is configured to prompt the electronic device to issue the alert based on data received from the first communication device and the second communication device relating to the position of the first communication device relative to the position of the second communication device.

15. The vehicle system of claim 14, wherein the data received from the first communication device and the second communication device relating to the position of the first communication device relative to the second communication device indicates that the roof panel is not disposed within the storage bag.

16. The vehicle system of claim 8, wherein the storage bag comprises:

a rubberized base.

17. The vehicle system of claim 16, wherein the first sensor is coupled to the rubberized base of the storage bag.

18. The vehicle of claim 17, wherein the storage bag is configured to be coupled to a rear side of a seatback disposed within the vehicle.

19. The vehicle of claim 18, wherein the rubberized base of the storage bag is configured to rest on a floor of the vehicle when the storage bag is coupled to the rear side of the seatback within the vehicle.

* * * * *